United States Patent [19]
Owl, deceased et al.

[11] Patent Number: 5,110,072
[45] Date of Patent: May 5, 1992

[54] CONTROL SURFACE STABILIZER HINGE

[75] Inventors: George A. Owl, deceased, late of Gardena, Calif.; Owl, legal representative David A., San Angelo, Tex.

Gardena, Calif.; by David A. Owl, legal representative

Related U.S. Application Data

[63] Continuation of Ser. No. 354,320, May 19, 1989, abandoned.

[73] Assignee: Rockwell International Corporation, El Segundo, Calif.

[21] Appl. No.: 611,372
[22] Filed: Nov. 13, 1990
[51] Int. Cl.$^5$ .............. B64C 3/50; B64C 9/02; B64C 9/08
[52] U.S. Cl. .................. 244/213; 244/75 R
[58] Field of Search .............. 244/75 R, 47, 213–215

[56] References Cited

U.S. PATENT DOCUMENTS

| | | | |
|---|---|---|---|
| 4,447,028 | 5/1984 | Wang | 244/215 X |
| 4,531,417 | 7/1985 | Hollman | 244/213 X |
| 4,544,118 | 10/1985 | Robinson | 244/215 X |
| 4,615,499 | 10/1986 | Knowler | 244/214 X |
| 4,687,162 | 8/1987 | Johnson et al. | 244/213 |
| 4,705,236 | 11/1987 | Rudolph | 244/215 X |
| 4,717,097 | 1/1988 | Sepstrup | 244/215 X |
| 4,773,620 | 9/1988 | Seidel | 244/75 R |

FOREIGN PATENT DOCUMENTS 3618776 12/1987 Fed. Rep. of Germany .... 244/75 R

*Primary Examiner*—Margaret A. Focarino
*Assistant Examiner*—James M. Kannofsky
*Attorney, Agent, or Firm*—Charles T. Silberberg; Terrell P. Lewis; Harold C. Weston

[57] ABSTRACT

Coupling between a control surface and a flexible wing, or other lifting member, is provided by a novel piston-cylinder hinge mechanism which allows the control surface to move, out-of-plane, while following deflections of its associated lifting surface, reducing required actuator energy and enabling more effective use of control forces.

5 Claims, 2 Drawing Sheets

CONTROL SURFACE STABILIZER HINGE

This is a continuation of copending application Ser. No. 07/354,320 filed May 19, 1989, now abandoned.

BACKGROUND OF THE INVENTION

1. Field of the Invention

This invention relates to hinge mechanisms and more particularly to a hinge mechanism coupling a moveable control surface on the leading or trailing edge of a flexible wing, or other lifting surface element, to that element. Such control surfaces often extend over an appreciable part of the leading or trailing edge of their associated lifting surfaces, and when such lifting surfaces become deflected, as is the case of most high performance aircraft, the control surfaces must follow the deflection to preserve streamlines and wing flight parameters. Actuation of such deflected control surfaces requires less energy when their coupling edges are allowed to move in-plane with the associated lifting surfaces. A multiple point suspension system for typical control surfaces holds the two ends of the control element fixed rotatably to the supporting surface. One or more intermediate hinge mechanisms couples the central portion of the same to its associated lifting surface and shapes its plane to approximate that of the lifting surface.

Commanded rotation of the deflected control surface introduces out of plane stresses and tends to force the control surface to strain at its attach points. These stresses tend to separate the intermediate hinge points from their component parts. In the hinge mechanism of this invention, a piston-like element, or stress bar, is rotatably coupled to the flexed lifting surface. The piston rides within a cylinder type socket fixed in the control surface so that no out of plane motion of the control surface hinge point is permitted as the surface itself is rotated. In summary, the control surface maintains its flexed condition while deflected to provide control forces and its intermediate hinge point is allowed fore and aft motion to eliminate strains and stresses resulting from forces tending to un-flex the support surface.

2. Background Art

Mechanical means used to compensate for binding of hinged surfaces are well known in the field of this invention. Fixed hinge arrangements in U.S. Pat. No. 3,140,066, Multiple Pivot Mounting Means, by R. S. Sutton, et al., and in U.S. Pat. No. 4,213,587, Hinge Arrangement for Control Surfaces, by W. G. Roeseler, et al., are but two of the types of compensation adaptable to distorted hinge lines.

No knowledge of prior use of the socket/piston arrangement of the within support stabilizer hinge has been forthcoming from a search of the art involved here.

The primary object of this invention is to provide a hinge device useable with large control surfaces connected to flexible thin wings of high performance aircraft, which provides positive vertical support and "out of plane" constraint on such control surfaces in the face of significant flexure of their associated thin wings.

SUMMARY OF THE INVENTION

Aircraft wings usually incorporate two or more symmetrically arrayed hinged segments at their trailing and/or leading edges, which are rotated about an essentially spanwise hinge axis to change the effective wing chamber and thereby generate (or permit) changes in wing lift for purposes of control or reduction of the minimum flying speed. These devices are commonly called ailerons, elevons, flaps or rudders.

All conventional aircraft wings experience deflections as a result of the lifting forces necessary for flight and the magnitude of this deflection is a function of the lifting intensity, wing geometry and structural properties of its component materials. Evolving technology in structural materials, mainly advanced composites, is resulting in a trend towards increased wing slenderness and thus increased bending deflections in flight. Some designs, such as HiMAT RPRV, encourage passive bending deflection to capitalize on resulting benefits.

A hinged leading or trailing edge segment (viz. "control surface") may have two or more finite hinges, usually incorporating self-aligning bearings. If only two hinges are used, the contour of the hinged segment will fair smoothly with the wing contour at only one location condition (usually at the no-load or jig condition). Wing deflection results in a vertical mismatch between wing and control surface profiles (see FIG. 6), which increases with distance from the nearest hinge and with increasing wing deflection. This mismatch is undesirable because it degrades aerodynamic performance of the wing.

To reduce the mismatch between wing and control surface, it is common practice to incorporate three or more finite hinges for the movable surface; forcing the control surface to assume a deflected shape approximating the deflected shape of the wing. This gives rise to significant problems when the control surface is intentionally caused to rotate about its hinges in the presence of wing flexure. Since the three or more hinges are not on a common centerline, because of the wing's bending, it is apparent that structural deformation must occur when the control surface is caused to rotate about them. This additional structural deformation, because it is in a direction in which the wing and segment are inherently stiff, can result in undesirable or destructive loads, particularly on the hinges and trailing edge structure.

Structural deformation from commanded rotation represents stored strain energy, which must be delivered manually by the operator or by the actuation device which caused the segment to rotate. Provision of this additional energy must be made by additional size, weight and complexity of motive systems and their associated equipments.

It is a purpose of this invention to provide a hinge means which permits use of three or more hinges on a moveable control surface, eliminating, or greatly reducing undesirable structural deformations of flexed lifting surfaces and minimizing power requirements for control surface deflection.

Operation of such a stabilizer hinge is illustrated by the attached drawings in which.

DETAILED DESCRIPTION OF PREFERRED EMBODIMENT

Figure 5:
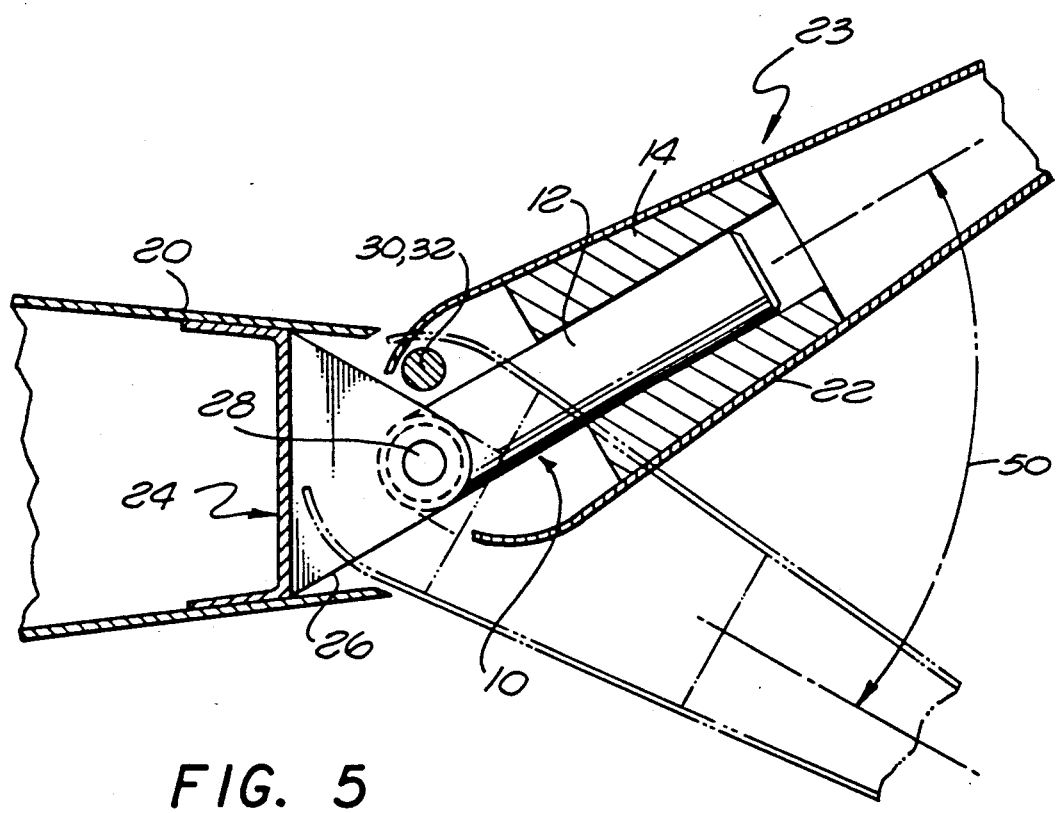
FIG. 5 shows the piston-cylinder hinge configuration for stabilization of a control surface on a deflected wing.
Figure 6:
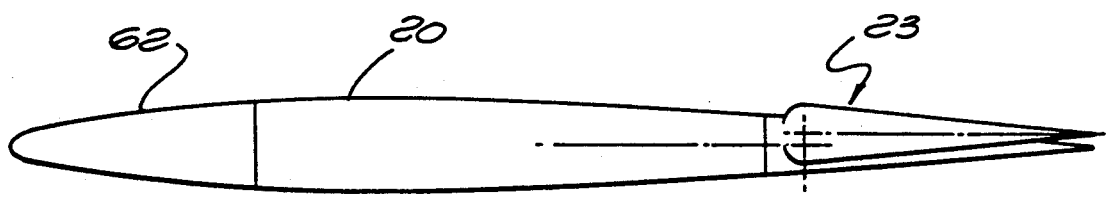
FIG. 6 is a sectional view of a flexed lifting surface with its associated control surface suspended only at its end hinge points by rotary joints.

The hinge mechanism 10 of FIG. 5 is shown in the sectional view of a typical deflected airfoil 20, coupling control surface 23 to the airfoil. Hinge 10 is mounted on a wing spar 24 or other fixed component of wing 20 through a rotary joint having base 26 fixed to spar 24 and axle means 28 coupling shaft 12 thereto in rotary freedom.

Figure 3:
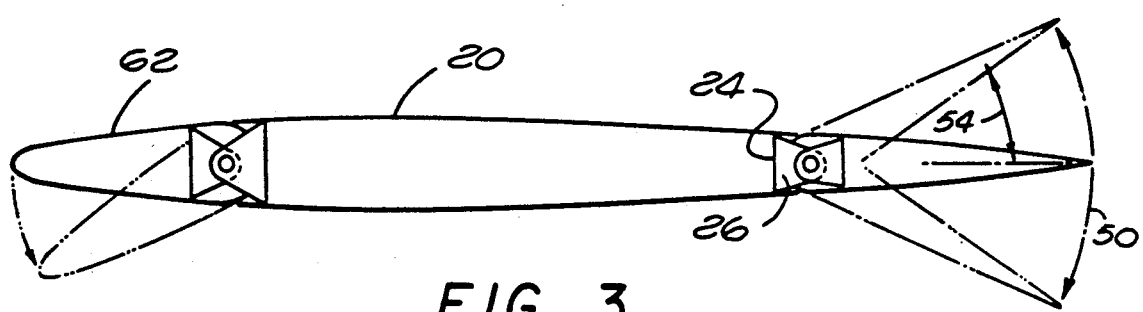
FIG. 3 shows the normal hinge points of leading and trailing edge control surfaces.
Figure 4:
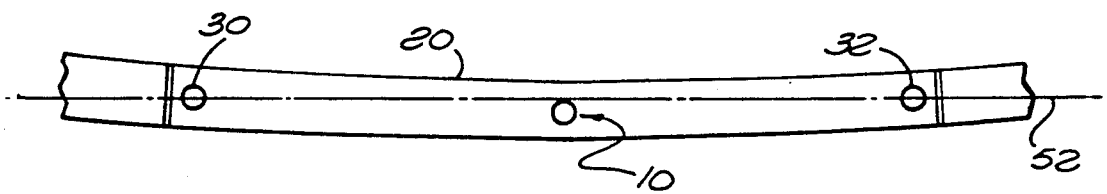
FIG. 4 shows a deflected wing section with a 3-hinge support system for a control surface.

Hinge 10 is illustrated in FIGS. 4 and 5 as intermediate between conventional rotary joints 30 and 32. Rotary joints 30, 32 are fixed in wing structure and allow control surface 23 to move in the design range indicated by angle 50 of FIGS. 5,3.

In normal flight, wing 20 will deflect so that hinge 10, in line with rotary joints 30,32 in the unflexed or jig shape of wing 20, is displaced from hinge axis 52 (between rotary joints 30,32) as in FIG. 4.

As control surface 23 is commanded to orientations off center from its null position on a flexed wing, its leading edge follows a track similar to that of a catenary between rotary joints 30,32, moving from null to the displaced position. Hinge 10, and the section of surface 23 immediately below and above it, moves in an arc to achieve the same. As surface 23 is commanded to an upwards angle 54, above the wing 20 plane (FIG. 3), bottom of the catenary between joints 30,32 (FIG. 5) moves aft and shaft 12 is withdrawn from cylinder 14, with no appreciable difference in angle 54 of surface 20 to 22 along its total length. Flexure of wing 20 is maintained along the span of aileron 23 over the range 50 of surface travel.

When aileron 23 is commanded to an angle below wings 20's plane, shaft 12 is driven rearward in cylinder 14 but still prevents vertical motion of flexed surface 22 out of its conformity with the general shape of wing 20. No destructive interference or mechanical binding results from the three hinges' not being "in line".

While FIG. 5 illustrates application of hinge 10 to a wing 20 trailing edge mounting, FIG. 3 shows it to be amenable to either leading or trailing edge use.

Figure 1:
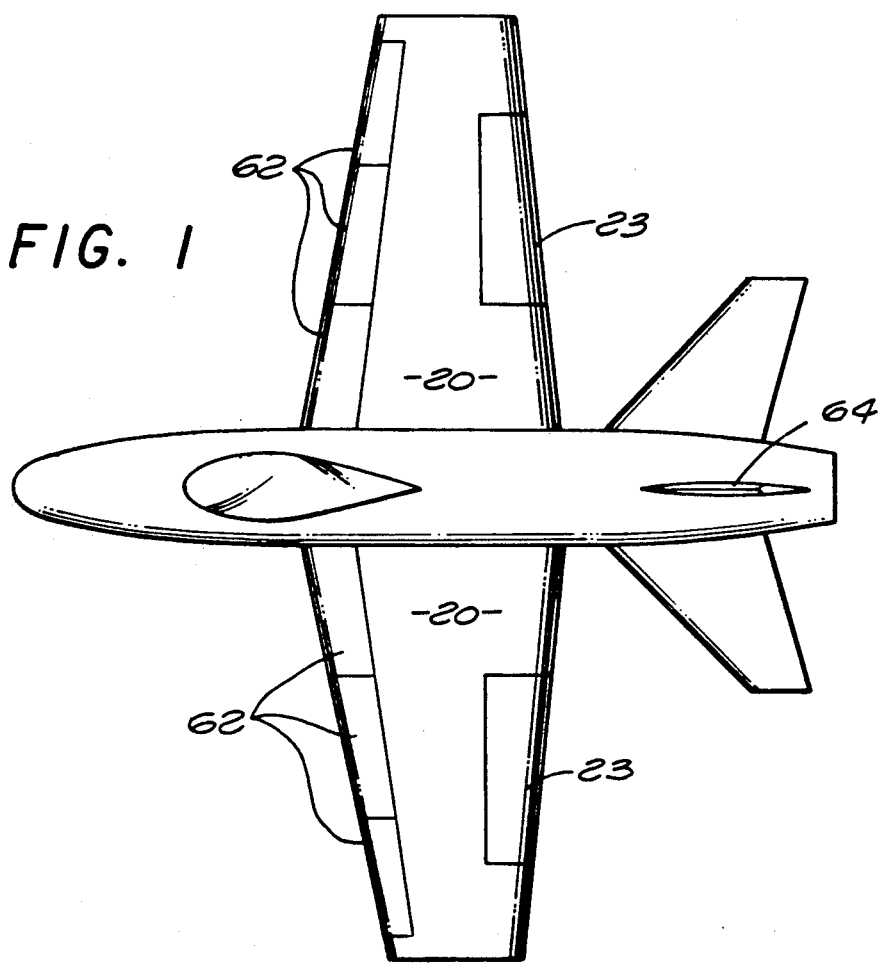
FIG. 1 is a top view of a typical aircraft utilizing leading and trailing edge segments on its lifting and control surfaces.
Figure 2:
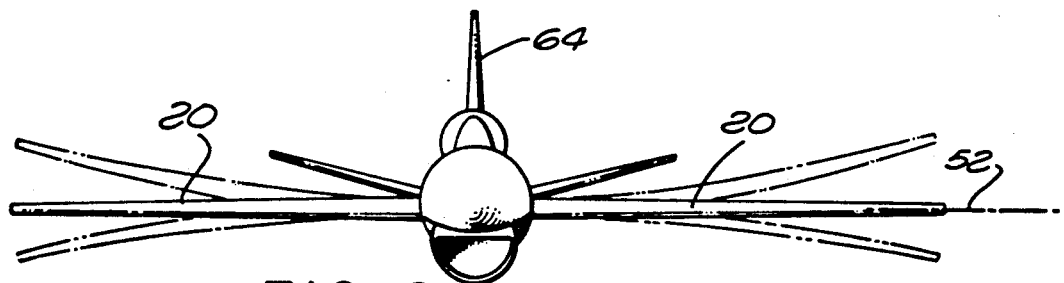
FIG. 2 is a front view indicating flexure regime of a typical high performance aircraft wing.

FIGS. 1 and 2 show, generally, where hinge 10 surfaces might be found on high performance aircraft. Leading edge flaps 62, vertical stabilizer/rudder 64 and ailerons 23 are the most general application points.

While this invention is presented as a "shaft-in cylinder" mechanism, it will be readily obvious to those skilled in the mechanical arts that a variety of sliding member/socket restraint means will perform the inventive action. Any fixed sleeve in an aerosurface with a sliding member coupled to the cooperating control surface member, said sliding member restricting "out of plane" motion of the attach point of the surfaces, is comprehended hereby.

What is claimed is:

1. A multiple point suspension system for attaching a control surface to an edge of a flexible wing, comprising:

a plurality of active hinges, each said active hinge including means for urging said control surface into various angular relationships relative to said wing, and a plurality of passive hinges for pivotally coupling said control surface to said flexible wing at locations between said active hinges, each said passive hinge including a shaft rotatably coupled, by axle means, to said flexible wing, and a cylinder fixedly housed within said movable control surface, each said shaft being slidably received within a respective one of said cylinders, whereby, when said wing is flexing and as said control surface is being moved through actuation of said urging means to one of said angular relationships relative to said flexible wing, said passive hinges allow said control surface to move in out-of-plane correspondence with said flexed wing.

2. The multiple point suspension system of claim 1, wherein
   at each passive hinge, contact between said control surface and said flexible wing is substantially only between said shaft and said cylinder.

3. A hinge arrangement for preserving surface conformity between the flexible wing of an aerospace vehicle and a moveable control surface pivotally coupled to such wing along an edge of said control surface via active hinges, said hinge arrangement comprising:

at least one passive hinge disposed between a pair of said active hinges, each said passive hinge including a solid shaft rotatably coupled, by axle means, to said flexible wing at a location between said active hinges, and a cylinder fixedly coupled to said moveable control surface, said shaft being slidably received within said cylinder.

4. The hinge arrangement of claim 3, wherein
   each said passive hinge includes only a single axle means.

5. The hinge arrangement of claim 3, wherein
   said shaft and cylinder of each said passive hinge permit transference of both lateral and axial forces between said control surface and said flexible wing.

* * * * *